Figure 1:
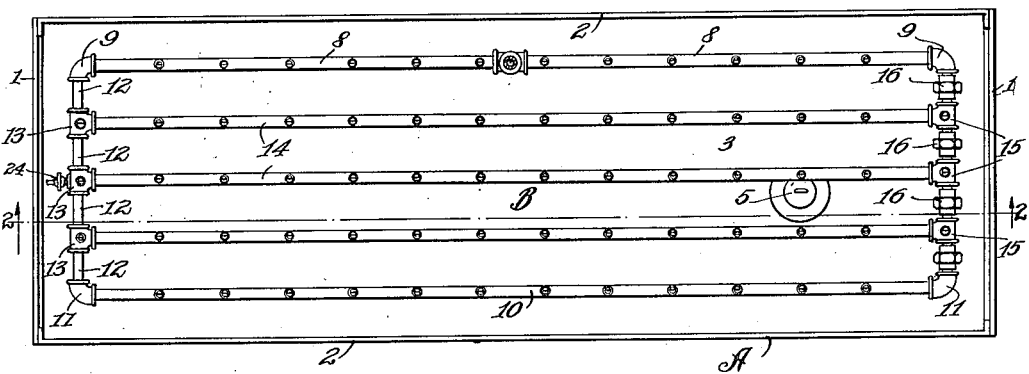

O. ZISTEL.
AERATING DEVICE.
APPLICATION FILED MAY 4, 1914.

1,214,637.
Patented Feb. 6, 1917.

WITNESSES:
R. L. Bruck.
H. B. McGill.

INVENTOR,
Oscar Zistel
By Hull and Smith
ATTYS.

UNITED STATES PATENT OFFICE.

OSCAR ZISTEL, OF SANDUSKY, OHIO.

AERATING DEVICE.

1,214,637.  Specification of Letters Patent.  Patented Feb. 6, 1917.

Application filed May 4, 1914. Serial No. 836,081.

*To all whom it may concern:*

Be it known that I, OSCAR ZISTEL, a citizen of the United States, residing at Sandusky, in the county of Erie and State of Ohio, have invented a certain new and useful Improvement in Aerating Devices, of which the following is a full, clear, and exact description, reference being had to the accompanying drawings.

This invention relates to a device for aerating water contained in fish tanks, whereby air may be introduced into the water without agitating the water or disturbing the fish. It is especially adaptable to tanks which are carried upon railway cars and other vehicles that are used for the transportation of live fish. Because of the limited space afforded by such vehicles the tanks are comparatively small; and in order to make the expense of transportation as light as possible, such a number of fish are placed within each tank as makes it necessary to supply, by artificial means, additional air to the water within the tank, in order to keep the fish in a healthy condition.

It might be well, before proceeding with the objects of the invention, to set forth, generally, the requirements of a device of this kind. In the first place, the air must be introduced into the water in such a manner as to avoid undue agitation of the water. It has been found, by introducing the air into the water through a tube or pipe which has perforations therein, which are large enough to prevent their becoming too easily stopped up, that the water is caused to bubble and to become greatly agitated, and turn the fish over and chafe them, thereby depreciating their value, or resulting, possibly, in a total loss. Furthermore the air issuing from the pipe in the quantity that is permitted by the size of the openings, rises immediately to the surface of the water in the form of bubbles without having any aerating effect upon the water. Efforts have been made to overcome this difficulty by providing the pipe with apertures of sufficient size to receive plugs of wood, the wood employed for such purpose being of a comparatively loose, fibrous nature and, therefore, porous enough to permit the flow of air therethrough. It is obvious, however, that such an arrangement would not prove satisfactory, since the shrinking and swelling of the wooden plugs would cause the plugs to loosen in the holes, or to become so contracted when within the water that the pores would become closed. The manner of arranging the tubes through which air is admitted to the tanks, in order that said tubes may be easily removed for draining or cleaning purposes, has been a problem.

The objects of my invention are to provide a rigid and substantial frame that is constructed of tubing, and which may be placed in a horizontal position on the bottom of fish tanks which has a very simple means of connecting it to an air supply whereby a separation of the connection may be very quickly and easily effected, and which has a pet-cock for draining the tubes when desired; and to provide air tips or distributers for insertion through the walls of the tubes through which the air may escape into the water, the tips or distributer being so constructed as to effect a very fine separation of the air, and to direct the air from the tip or distributer in a horizontal plane, whereby a very effective distribution of the air is accomplished and a thorough intermingling of the air and water is effected, without the slightest danger of the water becoming agitated or the fish within the tank, disturbed.

Figure 2:
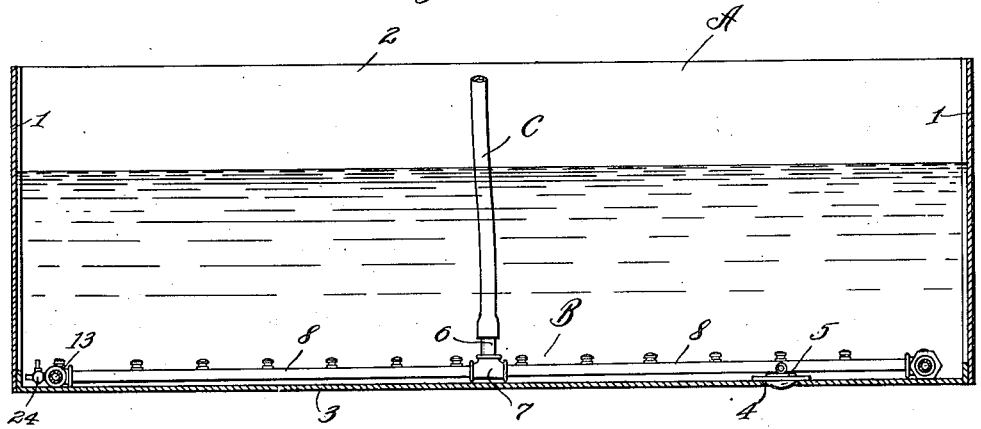
Figure 3:
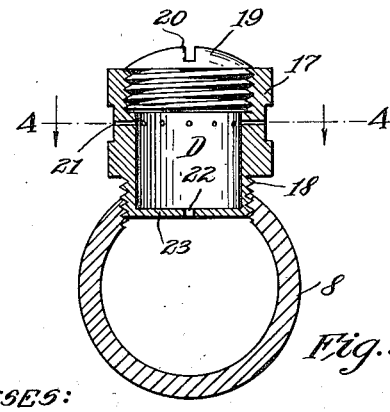
Figure 4:
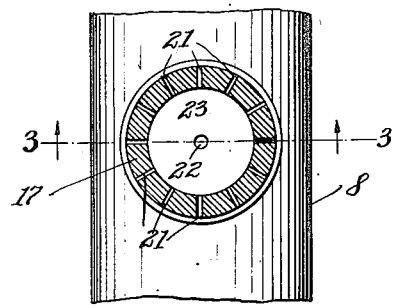

In the accompanying drawing, wherein similar reference characters designate corresponding parts throughout the several views, Figure 1 represents a plan of a fish tank having one of my aerating devices therein; Fig. 2 is a vertical, longitudinal section on the line 2—2 of Fig. 1, and looking in the direction of the arrows; Fig. 3 is a transverse, vertical section through one of the tubes and through the center of one of the tips carried thereby, said section being represented by the line 3—3 of Figs. 1 and 4; and Fig. 4 is a horizontal section on the line 4—4 of Fig. 3.

The tank A shown herein comprises end walls 1, side walls 2, and a bottom 3, which is provided with a cleanout or drain opening 4 that is adapted to be closed by a stopper 5. Upon the bottom 3 of the tank rests the aerating device of my invention, which is shown generally at B, and which is supplied with air through a flexible tube C, connected to the device by having its lower end pressed down over the vertical tubular extension 6, of the device. The extension 6 has its lower end threaded into a T 7, and extending each direction from the T is a tube 8. The outer ends of the tubes 8 are provided with elbows 9. The tubes 8 extend along one side of the tank, and adjacent the opposite side walls 2 thereof there extends a tube 10, each end of which is provided with an elbow 11. The elbow 9 of the left hand tube 8, as arranged in the drawing, and the elbows 11 of the corresponding end of the tube 10, are connected by a series of nipples 12, and T's 13. Each of a plurality of tubes 14, has one of its ends threaded into the lateral branch of one of the T's 13, and upon the opposite end of each of the tubes 14 is threaded a T 15. The tubes 14 are of such a length as to bring the T's 15 in axial alinement with the opposed branches of the right hand elbows 9 and 11 of the tubes 8 and 10, respectively. The adjacent ends of these elbows and T's are secured together by unions 16. From this description it will be seen that the device B consists of a substantial and rigid frame that is made up of tubes that are connected by appropriate fittings through which communication is established between the various tubes.

At suitable distances apart, the tubes 8, 10, and 14 are tapped on their upper sides for the reception of the threaded ends of the tips or distributers D. Each tip or distributer comprises a hollow, cylindrical body 17 which has a reduced, externally threaded lower end 18 that is adapted to be threaded through the wall of one of the tubes of the frame B. At its upper end the body portion 17 of the distributer is internally threaded for the reception of a plug 19 which has a groove 20 for the application of a screw driver whereby it may be firmly screwed into place. Just below the bottom of the plug 19, the cylindrical wall of the body portion 17 is perforated as shown at 21, the perforations being in a substantially horizontal plane. An aperture 22 is formed in the bottom wall 23 of the tip or distributer, and through this aperture the air is admitted to the interior of the distributer, from where it escapes through the smaller apertures 21 in a manner previously mentioned. This design of tip or distributer provides a very desirable construction, for it permits of a comparatively free passage of the air into the water, but so divides the particles thereof that a thorough intermingling of the air and water is effected; and furthermore, the aperture 22 may be sufficiently large to prevent its becoming clogged with sediment which might accumulate within the interior of the distributer. However, the presence of sediment within the distributer is hardly likely, because the quantity of water which would back into the distributer through the openings 21 when the supply of air is cut off, is not thought sufficient to deposit any appreciable amount of sediment therein. Moreover, as the sediment in the water of the tank settles toward the bottom, there is no danger of its entering the perforations 21 because of the location and horizontal disposition of said perforations. Furthermore, I wish to call attention to the fact that the tip or distributer disclosed herein may be very easily and quickly cleaned by the removal of the plug 19 and the subjection of the interior of the distributer to a blast of air. On the other hand, should one of the tips or distributers become plugged through any cause, it may be very quickly removed from the tube and a clean one substituted therefor.

When it is desired to clean the tank, the connection C may be drawn off of the extension 6 and the frame B lifted out of the tank. Also, in cold weather, when it is desired to drain the frame to protect it against damage from freezing, it may be disconnected as just described and tilted on edge with the extension 6 down. Ordinarily however, when the tanks are emptied, the frame may be drained through the pet-cock 24 that extends from one of the T's 13, a sufficient amount of water thus escaping to lower the level below the tips or distributers, and avoiding the possibility of their becoming clogged or corroded.

Having thus described my invention, what I claim is:—

1. An aerating device for fish tanks, said device comprising a pair of longitudinal tubular members, transverse tubular members connecting the corresponding ends of the longitudinal members, the tubular members intercommunicating and certain of them being provided with threaded openings, and perforated threaded tips, one of which is adapted to be screwed into each of the aforesaid openings, said tips acting to spray the air substantially horizontally into the water.

2. An aerating device for fish tanks, said device comprising a pair of longitudinal tubular members, transverse tubular members connecting the corresponding ends of the longitudinal members, intermediate longitudinal members connecting the aforesaid transverse members, all of the tubular members intercommunicating and certain of them being provided with threaded openings, perforated threaded tips, one of which is adapted to be screwed into each of the aforesaid openings, said tips acting to spray the air substantially horizontally into the water, and an inlet connection carried by one of the tubes.

In testimony whereof, I hereunto affix my signature in the presence of two witnesses.

OSCAR ZISTEL.

Witnesses:
 BRENNAN B. WEST,
 HUGH B. McGILL.